(12) United States Patent
Jacob

(10) Patent No.: US 6,206,524 B1
(45) Date of Patent: *Mar. 27, 2001

(54) LENSLESS TRANSPARENCY SHADOWGRAPH

(76) Inventor: Daniel Jacob, 48370 Sawleaf St., Fremont, CA (US) 94539

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,860

(22) Filed: Mar. 1, 1999

Related U.S. Application Data

(63) Continuation of application No. 08/812,556, filed on Mar. 7, 1997.

(51) Int. Cl.[7] .................................................. G03B 21/14
(52) U.S. Cl. ................................ 353/43; 353/80; 353/119
(58) Field of Search ................................. 353/43, 29, 39, 353/62, 80, 79, 87, 97, 119, 120, DIG. 3; 434/314

(56) References Cited

U.S. PATENT DOCUMENTS

| | | | |
|---|---|---|---|
| 1,745,407 | * | 2/1930 | Colberg .................................. 353/62 |
| 1,856,956 | * | 5/1932 | Jordan .................................... 353/62 |
| 1,972,123 | * | 9/1934 | Zimmerman ........................... 353/80 |
| 1,992,776 | * | 2/1935 | Schindler ............................... 353/43 |
| 2,048,365 | * | 7/1936 | Agate et al. . | 
| 2,090,086 | * | 8/1937 | Weiner . |
| 2,496,647 | * | 2/1950 | Woodbury .............................. 353/43 |
| 3,401,596 | * | 9/1968 | Hirsch ................................... 353/43 |
| 3,950,085 | * | 4/1976 | Grimm ................................. 353/119 |
| 4,408,850 | * | 10/1983 | Norek .................................. 353/119 |
| 5,088,814 | * | 2/1992 | Campbell ............................... 353/87 |
| 5,283,601 | * | 2/1994 | Lowe .................................... 353/62 |
| 5,477,283 | * | 12/1995 | Casey .................................... 353/62 |
| 5,624,173 | * | 4/1997 | Davidson ............................ 353/119 |

* cited by examiner

*Primary Examiner*—William Dowling
(74) *Attorney, Agent, or Firm*—Palmer C. DeMeo

(57) ABSTRACT

A low cost and yet versatile shadowgraph is described. The shadowgraph has two components, a transparency holder and a point light source with its mounting and energizing structure. The transparency holder is itself transparent and acts as a backing for a transparency whose shadow is to be formed. The point light source is provided by a flashlight bulb and it is mounted on a slidable collar which is, in turn, mounted on a linear post to enable the position of such light to be adjusted along one axis laterally of the projection surface. Movement of the light source along other axes is naturally done manually so as to minimize the expense associated with manufacturing the shadowgraph.

17 Claims, 4 Drawing Sheets

LENSLESS TRANSPARENCY SHADOWGRAPH

CROSS-REFERENCE TO RELATED APPLICATION

This patent application is a continuation of patent application Ser. No. 08/812,556 filed Mar. 7, 1997 by the inventor and entitled SHADOWGRAPH PROJECTOR.

DISCLOSURE

Background of the Invention

This present invention relates to graphic artistry and, more particularly, to an art transparency shadowgraph which is lensless, otherwise low cost, and yet is versatile.

As a general rule, most graphic artists, such as painters, do not have very much money. In some instances it is the parents of children whose creativity such parents want to encourage that want to reduce the amount of money being spent on, for example, a painting endeavor.

Most graphic artists want or desire an image projector that can be used to project a larger image of a smaller "image" (called an object in optics), on a canvas or the like. The projected image then can be traced or otherwise memorialized to allow the painter to paint a scene or portrait based on such projected image.

There generally are two types of projectors. One, called an opaque projector, reflects light from a scene onto a canvas or other surface. The other, called an image projector, is designed to be used with a transparent image (or "object") to project an enlarged view of such image onto a surface.

Most image projectors now available have at least one lens, a lens for focusing the image on the desired surface. Lenses, however, cost money and those art projectors which are now commercially available typically are quite expensive.

There is another class of projectors which do not have a lens and typically project just shadows of an object, rather than an image of the full object. These lensless projectors are lumped together herein and called "shadowgraphs". While shadowgraphs are available, most are special purpose ones that do not have the versatility needed by graphic artists. Moreover, some are fairly complex and/or otherwise expensive. Examples of special purpose shadowgraphs that are available include those described in U.S. Pat. Nos. 1,992,776, 2,048,365, 2,090,086, and 3,401,596.

SUMMARY OF THE INVENTION

The present invention is a lensless transparency shadowgraph which is especially useful by graphic artists. Besides not having a lens, it otherwise includes various features which result in the overall shadowgraph being quite versatile and yet of low cost.

As will be discussed in more detail below, a major feature of the invention is that, in common with many shadowgraphs, it includes a point light source and utilizes the same in such a way that a focusing lens is not needed. The position of this light source relative to the remainder of the projector is also changeable in a simple manner. While it is changeable manually along most axes relative to the projecting surface, a post-slidable collar arrangement is included to allow the position of the light source to be changed along one of the axes, simply by movement along a post. This will be discussed in more detail below.

The shadowgraph of the invention has many other features that also are responsible for it being a versatile, low-cost unit affordable by many. Another main feature is that the holder for the transparency provides a transparent backing for the same so that it will hold many different types of images (objects) to be projected without relying on such images for structural integrity. Most desirably, it is completely free of the structure for holding the light source so that for most degrees of movement it relies on manual movement for positioning by the artist himself/herself. It also simply relies on standard batteries, e.g., "D" flashlight batteries, to provide the low power electrical energy that is needed to energize the light source.

Other features and advantages of the invention either will become apparent or will be described in connection with the following, more detailed description of a preferred embodiment of the invention and variations.

BRIEF DESCRIPTION OF THE DRAWINGS

With reference to the accompanying sheets of drawing.

DETAILED DESCRIPTION OF A PREFERRED EMBODIMENT

Figure 1:
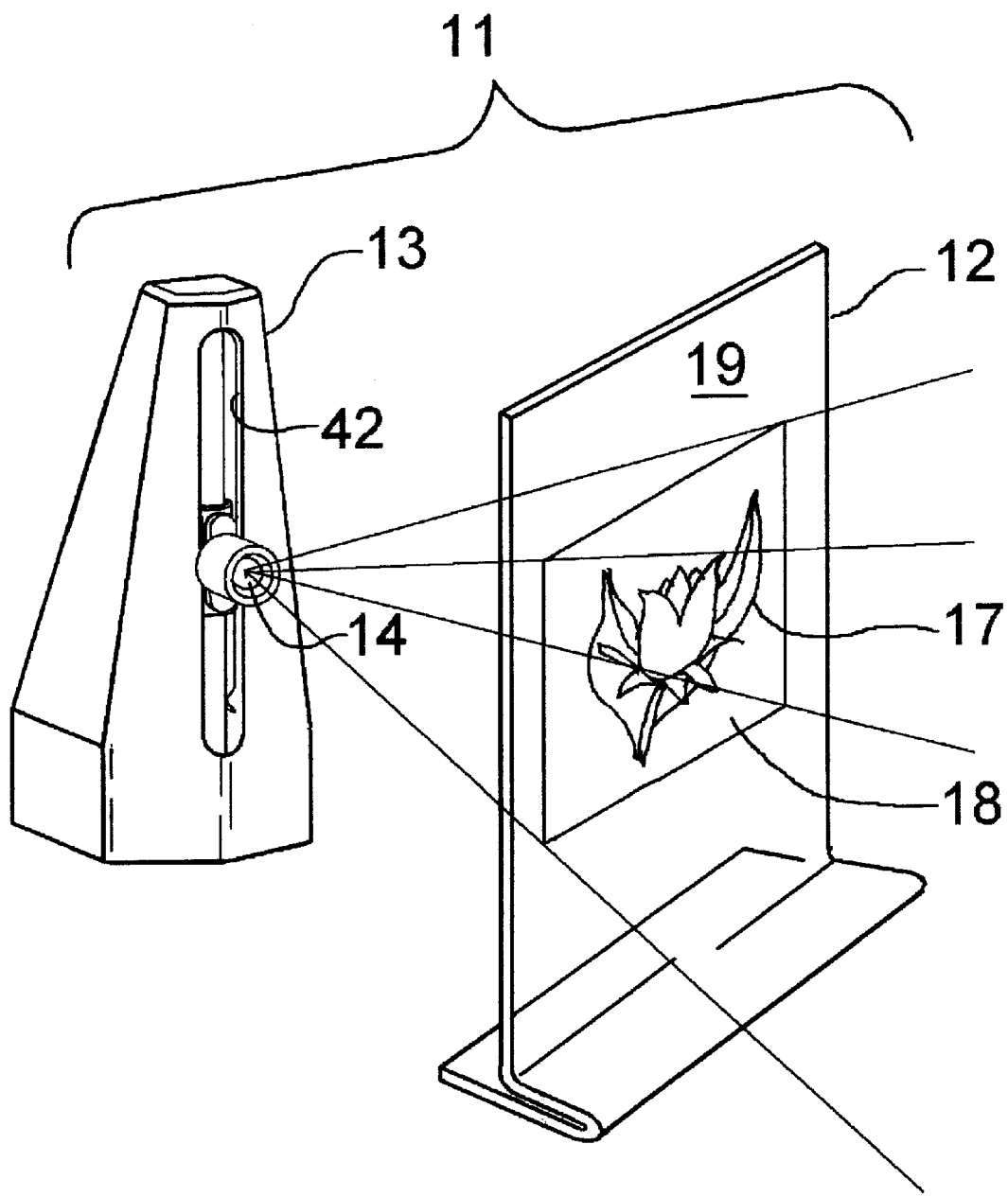
FIG. 1 is an overall isometric view illustrating a preferred embodiment of the invention.

The following, relatively detailed description is provided to satisfy the patent statutes. It will be appreciated by those skilled in the art, though, that various changes and modifications can be made without departing from the invention.

A preferred embodiment of the shadowgraph of the invention is generally referred to by the reference numeral 11. Such shadowgraph includes two independent parts, a transparency holder 12 and a light source with its mounting and energizing structure 13. One feature of the instant invention is that it is lensless. This is achieved in this preferred embodiment by using a simple flashlight bulb 14 as a point light source. In this connection, some flashlight bulbs have a very small filament (not shown) from which all light which emanates from the bulb is generated, which filament for all practical purposes can be considered as simply a point light source. The glowing portion of the filament should be equal to or less than about 1½ millimeters. (The point light source feature of a flashlight bulb is not used in most flashlights—a flashlight typically has a reflector which, among other things, widens the output from the bulb and, in effect, "destroys" this point light source feature.) It has been found that even though a focusing lens is not included, the invention provides a relatively sharp and enlarged shadow image of an object held by the transparency holder. That is, the flashbulb 14 forms a generally divergent, conically-shaped beam 16 which is transmitted through an object 17 on a transparency 18 adhered to a surface 19 of transparency holder 12. (Although not shown, the transparency can be adhered to the holder in an appropriate location and orientation via tape, adhesive, etc.) If lines form an image to be projected, each of such lines acts, in essence, as two adjacent significant changes in gray scale, which changes cast shadows. (It is not necessary, of course, that there be two changes—the outline of a portrait image, for example, will form the desired shadow.)

As a feature of the invention, it will be recognized that during use of the same, the transparency holder provides a backing for the transparency. Since there is no reliance on the structural integrity of the transparency itself, a versatility needed by artists is added. Moreover, the transparency can be adhered to the backing in any angular position desired.

Figures 2, 3:
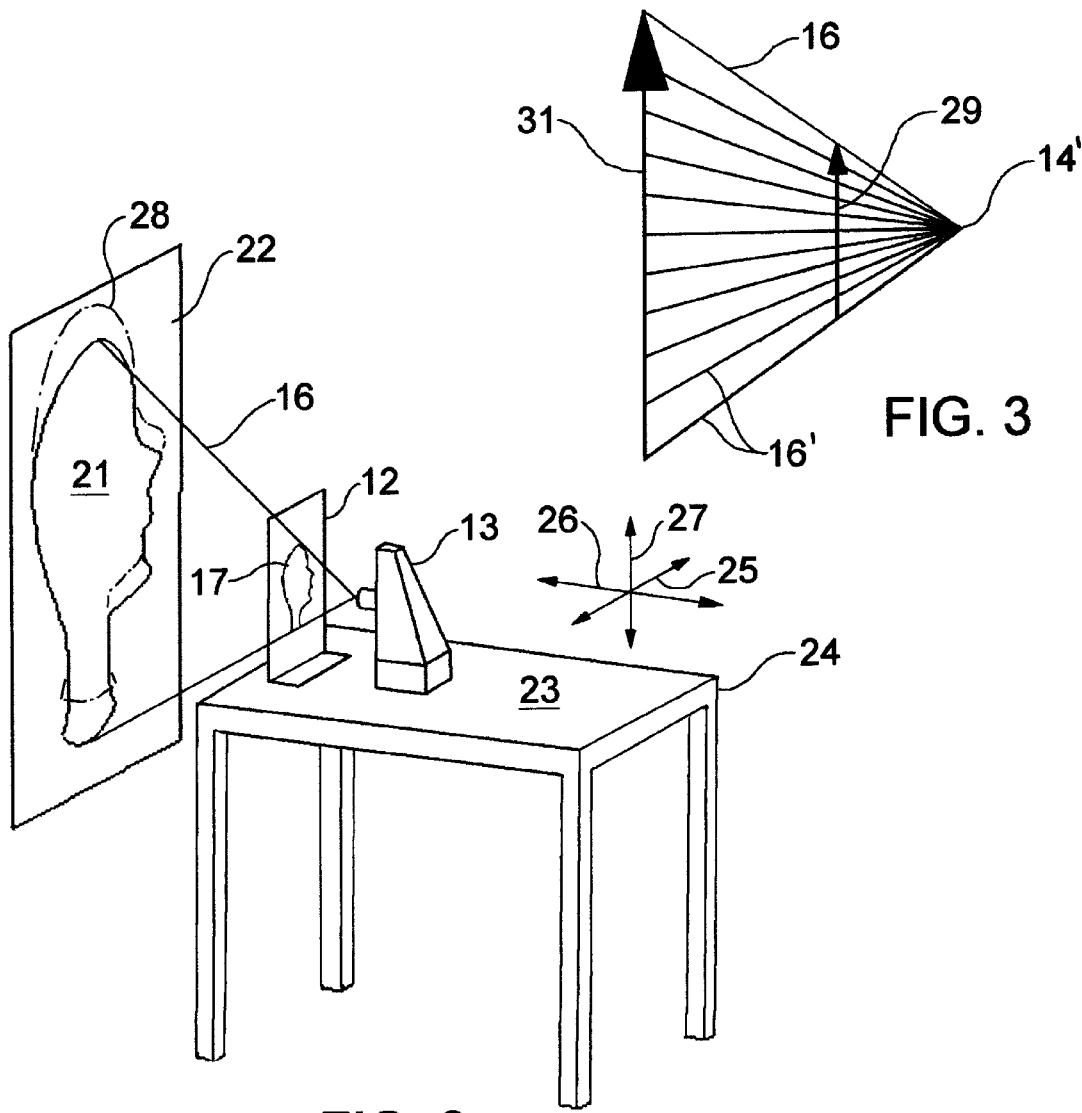
FIG. 2 is another overall isometric view showing use of such preferred embodiment.
FIG. 3 is a schematic optical plan view illustrating a feature of the invention.

FIG. 2 shows the shadowgraph of the invention being used to project an enlarged image of an "image" (as mentioned previously, this "image" is considered an object from the classical optic standpoint) onto a canvas or other vertically-oriented projection surface. That is, an enlarged shadow image 21 (FIG. 3) of those significant changes in gray scale in the object image is formed by the beam on a projecting surface represented in FIG. 2 at 22. Both the light source with its mounting and energizing structure 13 and the transparency holder 12 with a transparency to be projected are placed on a horizontal surface such as is provided by tabletop 23 of table 24. It will be appreciated that it is easy and natural for a user to move the transparency holder 12 and light source 13 back and forth in the directions represented by arrow lines 25 and 26 as is appropriate to achieve the desired shadow. The mounting structure for the bulb 14 is designed to enable the light source and beam 16 to be adjusted vertically, in the direction of arrow line 27, i.e., orthogonal to the table 23 as is appropriate to change the vertical positioning of the shadow. This adjustment of the vertical shadow is represented in FIG. 2 by the phantom line outline 28 of the projected image.

The ability provided by the preferred embodiment of the invention to adjust the position of the light source in one lateral direction (lateral of the image to be projected) is a major feature of the instant invention. That is, although as mentioned previously, it is easy to change the relative positions of the transparency holder and light mounting structure in those directions parallel to the tabletop 23, it is not easy to change the position of the light source in the direction 27, i.e., in the direction orthogonal to the table surface.

It will be recognized that the above is a horizontal arrangement, i.e., the optical axis (the center of the conical beam) is horizontal. In some instances with different embodiments of the invention the optical axis may be vertical and the one lateral direction of movement provided by the mounting structures for the light source be horizontal, rather than vertical as in this preferred embodiment.

The sharpness of the shadow lines that is necessary depends, of course, on the use to which the shadow image is put. A major artistic use is to form a shadow for tracing, which shadow need not be too sharp. The degree of gray scale change that is necessary to form a shadow depends to a large degree on the ambient light, i.e., the light at the projecting surface which is not part of the beam 16. In general, it is desirable that the image be created and traced under low ambient light conditions. While in the dark it may be hard to differentiate between the projected image and that portion of the same which has been traced, it is recommended that when the invention is being used, a low ambient light that can be periodically turned on to ascertain this distinction also be used. Even though increasing the intensity of the ambient light tends to reduce the visibility of the projected image, it also increases the visibility of the traced image. This periodic additional ambient light simply can be provided by one using a flashlight and filtering its beam through a white sheet of paper or the like for light diffusion.

Although the physics responsible for the shadow phenomenon of the invention is not entirely understood, it is believed that the bundles of light in the divergent conical beam 16 that are equally spaced from the light source 18 are "spherically coherent," i.e., that the rays of light making up the divergent beam from the point source do not cross one another and are not parallel. FIG. 3 is included to facilitate an understanding of this phenomenon. The point light source represented by the flashbulb 14 is shown at 14'. The various diverging bundles of light rays are represented at 16', whereas the full beam is represented at 16. The image to be projected is represented by arrow 29, whereas the projected shadow image is represented at 31. (Arrowheads are included on the image to be projected and the shadow image to emphasize the fact that there is no mirror-like reversal as is typical when a focusing lens is used.) Another way of stating the "shadow" phenomena is that a point light source generates light waves which are a spherically coherent bundle of light rays that will produce a scaled image on the projection surface of a point in the transparency; this is because no other rays of light can reach and obscure the projected shadow since the bundle of waves mentioned are the only ones traveling in the direction that they are.

Figure 4:
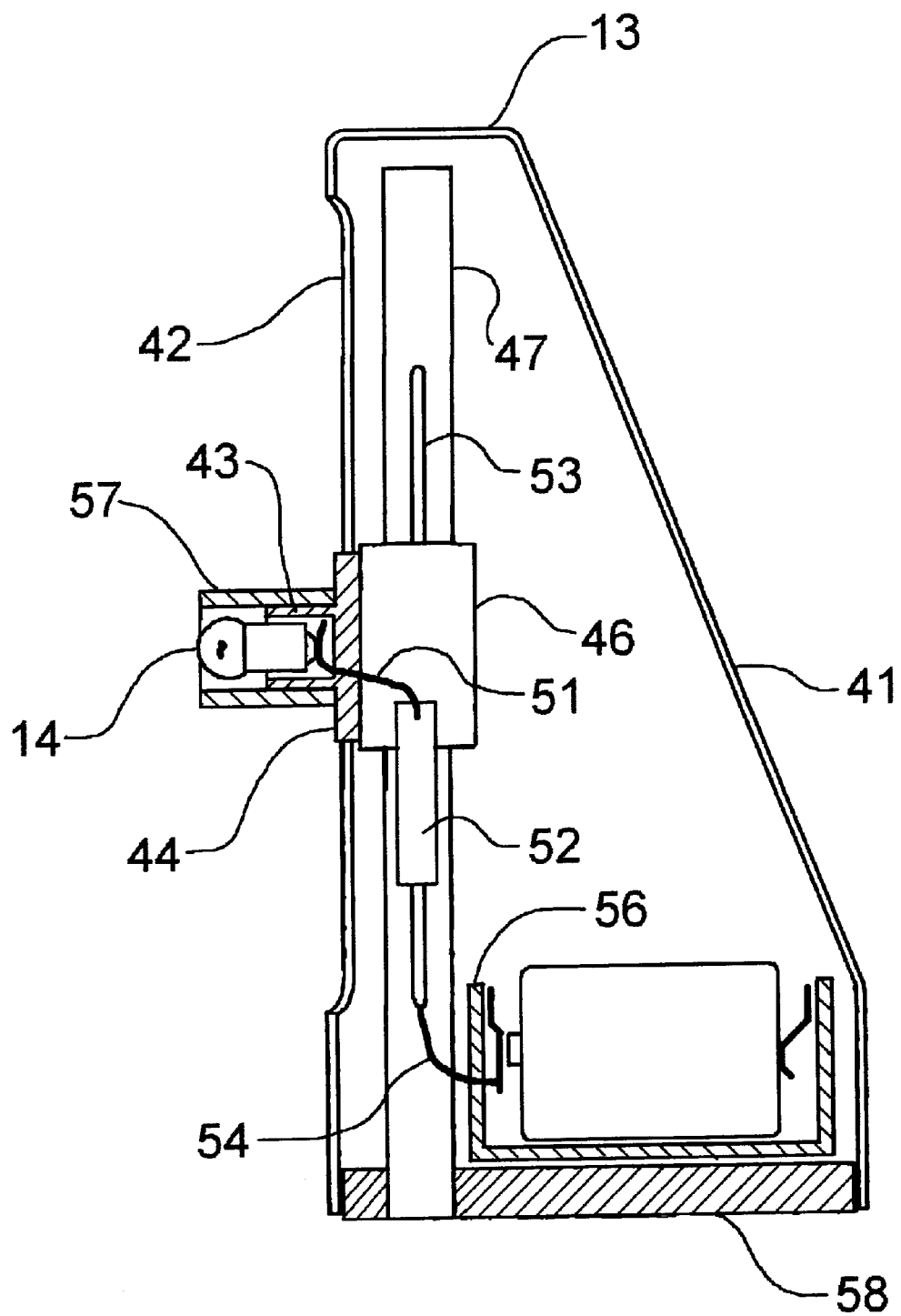
FIGS. 4 and 5 are side and top cut-away views, respectively, of the light source part of the preferred embodiment.
Figure 5:
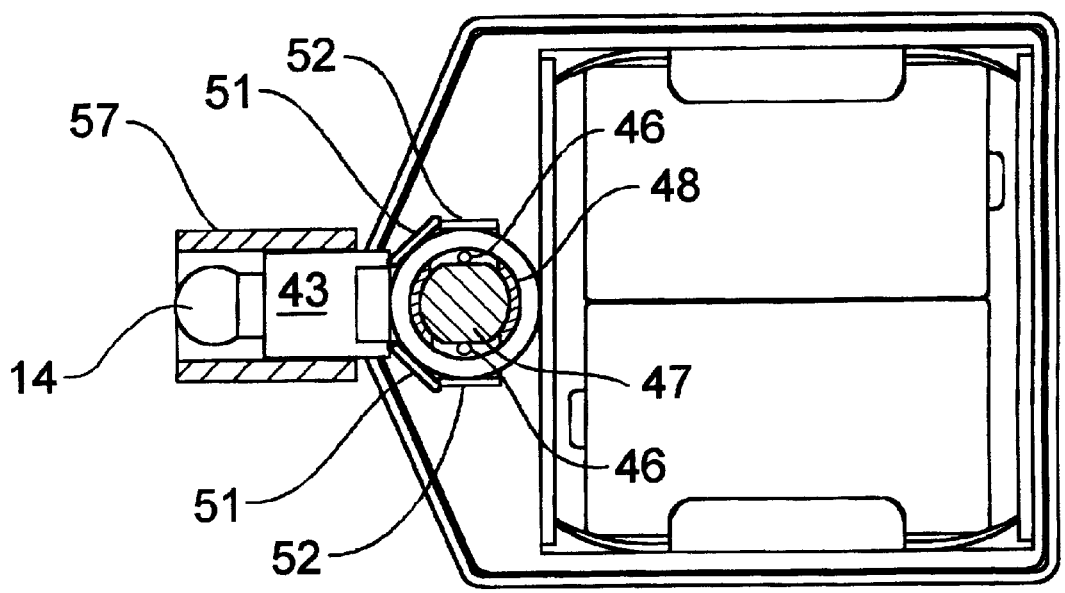

Details of the mounting and energizing structure 13 are shown in FIGS. 4 and 5 which respectively are side and top cut-away views. With reference to such figures, the mounting structure 13 includes an outer cover 41 having a slot 42 through which the light bulb 14 projects. Such light bulb plugs into an annular holder 43 which projects from a base 44 that, in turn, is adhered to an annular collar slider 46. Such slider 46 is, in turn, mounted for sliding movement on a linear, upstanding post 47.

It is movement of sliding collar 46 along the length of post 47 that provides the desired adjustment in one direction of the position of bulb 14. In this connection, the inside diameter of the collar 46 is spaced from the outside surface of the post 47, and a pair of opposed pieces of felt are located within the collar interposed between the collar and the post to enable the collar to be easily moved on the post while yet it will retain any position to which it is adjusted. Electrical energy is delivered to the bulb via a pair of wires 51 connected to a pair of opposed spring clips 52 which are adhered to the collar 46 to move with the same while engaging contact rods 53 which extend along opposed sides of the post 47. As best illustrated in FIG. 4, each of the contact rods 53 is connected via a wire 54 to standard battery terminals in a battery compartment 56. It will be appreciated that the bulb 14 can be turned "off" simply by sliding the collar 46 and bulb holder 43 vertically downward to the lower portion of the slot to disengage the spring clips 52 from the contact rods 53 and thus break the electrical connection.

An annular shade collar 57 is provided surrounding light bulb 14. Such shade collar interacts with the light emanating from the filament of bulb 14 and it is important that the shade be an absorbing one, rather than a reflecting one. As shown, it circumvents the projecting portion of the bulb portion and is linearly adjustable with respect to the same. That is, its position relative to the light bulb along its optical axis is adjustable to thereby adjust, as is desired, the angle of the conical beam. It should be noted that even though the shade interacts with the light, because it is an absorbing shade, it does not interfere with the characteristic of the light bulb being a point source of light.

The remainder of the mounting structure is simply a planar base 58 from which the post 47 projects orthogonally. This base is designed to rest on a table as is shown in FIG. 2 and thereby cooperate with such orthogonal post to define a path of movement of the light bulb which is orthogonal to such base (a vertical path in the preferred embodiment). The base also acts as means for mounting other aspects of the invention, such as the battery compartment 56, as illustrated.

As mentioned at the beginning of the detailed description, applicant is not limited to the specific embodiment and variations described above. For example, in some arrangement the beam of the light may be formed from a galvanometer or other mechanism for sweeping a pencil beam. Thus, the term "beam" as used herein is meant to encompass an arrangement in which there is a time varying component of a bundle of rays, which timing of a bundle may be different than the timing of a bundle of arrays interacting with other aspects of a transparency to be projected. Moreover, the term "cone" of light is not limited to a right circular cone as incorporated into the preferred embodiment—rather, the cone of light might be, for example, triangular or square in section.

A point light source could be formed by structure other than a flashlight bulb. For example, a laser beam which is quite narrow can be passed through white paper to diffuse the same and thereby provide a spherically coherent cone of light from, in essence, a point light source. Moreover, although the invention has been described in terms of its major use by graphic artists, it can be, of course, used by others and for other purposes as desired. The claims, their equivalents and their equivalent language define the scope of protection.

What is claimed is:

1. A lensless transparency shadowgraph for projecting onto a projection surface an enlarged shadow of a transparency comprising, in combination,
   A. a point light source;
   B. means for applying electrical energy to said point light source;
   C. means for mounting said light source to shine toward said projection surface; and
   D. a transparency holder having a surface area for holding a transparency to be projected, said transparency holder being continuous and transparent across the entire surface of said surface area providing a transparent backing for said transparency to be projected, said transparency holder being free of both direct or indirect connection to said means for mounting and being capable of standing on its own.

2. The lensless transparency shadowgraph of claim 1 wherein said point light source is selected to provide a diverging light beam.

3. The lensless transparency shadowgraph of claim 2 wherein said light source is selected to provide a diverging light beam which is spherically coherent.

4. The lensless transparency shadowgraph of claim 2 wherein said point light source is provided by a flashlight bulb.

5. The lensless transparency shadowgraph of claim 4 wherein said combination further includes a shade for blocking light emanating from said light source which may not be directed to said transparency.

6. A lensless transparency shadowgraph for projecting onto a projection surface an enlarged shadow of a transparency comprising, in combination,
   A. a point light source;
   B. means for applying electrical energy to said point light source;
   C. means for mounting said light source to shine toward said projection surface wherein said mounting means includes both an elongated light post and a light holder for said light source with the position of said light source along the length of said post being adjustable; and
   D. a transparency holder having a surface area for holding a transparency to be projected, said transparency holder being continuous and transparent across the entire surface of said surface area providing a transparent backing for said transparency to be projected, said transparency holder being free of both direct or indirect connection to said means for mounting and being capable of standing on its own.

7. The lensless shadowgraph of claim 6 wherein said light source is adjustable vertically along said light post.

8. The lensless transparency shadowgraph of claim 6 wherein said transparency holder is positionable toward and away from said projection surface independently of the position of said projection surface.

9. The lensless transparency shadowgraph of claim 6 wherein said point light source is provided by a flashlight bulb.

10. The lensless transparency shadowgraph of claim 6 wherein said point light source is selected to provide a diverging light beam.

11. The lensless transparency shadowgraph of claim 10 wherein said light source is selected to provide a diverging light beam which is spherically coherent.

12. The lensless transparency shadowgraph of claim 6 wherein said combination further includes a shade for blocking light emanating from said light source which may not be directed to said transparency.

13. A low cost, lensless transparency shadowgraph for projecting to a projection surface an enlarged shadow of a transparency, comprising, in combination:
    A. a point light source selected to provide a diverging light beam;
    B. means for directing electrical energy to said point light source;
    C. means for mounting said light source to shine toward said projection surface;
    D. a transparency holder for holding a transparency to be projected, which transparency holder extends across the surface area provided for holding a transparency to be projected, and is transparent at said surface area to provide a transparent backing for a transparency to be projected; and
    E. a compartment for electrical batteries and wherein said means for directing electrical energy to said light source includes linear contacts extending along a light post.

14. The lensless transparency shadowgraph of claim 13 wherein said light post is linear and a light holder for said point light source is slidable along the length thereof to provide adjustment of its position.

15. A low-cost, lensless transparency shadowgraph for projecting to a projection surface, an enlarged shadow of a transparency comprising, in combination:
    A. a flashlight bulb to provide a point light source;
    B. a shade for blocking light emanating from said light bulb;
    C. means for mounting said light bulb to shine toward said projection surface, which mounting means includes a linear light post and a light holder for said bulb slidable along the length of said post to provide adjustment of its position;
    D. linear electrical contacts extending along said light post to furnish electrical energy for energizing said light bulb; and E. a transparency holder for holding a transparency to be projected, which transparency holder is itself transparent to light emanating from said light bulb and extends across the area provided for holding a transparency to be projected to thereby provide a transparent backing for such transparency.

16. The lensless transparency shadowgraph of claim 15 further including, as part of said combination, a compartment for electrical batteries for furnishing electrical energy to said linear contacts.

17. The lensless transparency shadowgraph of claim 1 in which said mounting means includes both a light post and a light holder for said light source with the position of said light holder along the length of said post being adjustable and wherein said transparency holder is positionable toward and away from said projection surface independently of the position of said projection surface.

* * * * *